US012466180B2

(12) United States Patent
Kawano et al.

(10) Patent No.: US 12,466,180 B2
(45) Date of Patent: Nov. 11, 2025

(54) SIGNAL GENERATION DEVICE, LIQUID EJECTION DEVICE, AND SIGNAL GENERATION METHOD CAPABLE OF SUPPRESSING EXTENSION OF LIQUID EJECTION INTERVAL

(71) Applicant: KYOCERA Document Solutions Inc., Osaka (JP)

(72) Inventors: Daichi Kawano, Osaka (JP); Takashi Inoue, Osaka (JP); Keisuke Maeyama, Osaka (JP); Tatsuya Nakagawa, Osaka (JP); Satoshi Morimoto, Osaka (JP); Minori Yamamoto, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 315 days.

(21) Appl. No.: 18/475,537

(22) Filed: Sep. 27, 2023

(65) Prior Publication Data

US 2024/0109307 A1 Apr. 4, 2024

(30) Foreign Application Priority Data

Sep. 29, 2022 (JP) ................................. 2022-156453

(51) Int. Cl.
*B41J 2/045* (2006.01)

(52) U.S. Cl.
CPC ....... *B41J 2/04573* (2013.01); *B41J 2/04581* (2013.01); *B41J 2/04588* (2013.01); *B41J 2/04591* (2013.01)

(58) Field of Classification Search
CPC ......................... B41J 2/04573; B41J 2/04581; B41J 2/04588; B41J 2/04591
See application file for complete search history.

(56) References Cited

U.S. PATENT DOCUMENTS

2023/0311490 A1* 10/2023 Maeda ................. B41J 2/04568 347/11

FOREIGN PATENT DOCUMENTS

JP 2000117969 A * 4/2000 .......... B41J 2/04588
JP 2012223936 A * 11/2012 .......... B41J 2/04581
(Continued)

OTHER PUBLICATIONS

Oshima, MachineTranslationofJP-2012223936-A, 2012 (Year: 2012).*
Matsuo, Machine TranslationofWO-0121408-A1, 2001 (Year: 2001).*
Okuda, Machine TranslationofJP-2000117969-A, 2000 (Year: 2000).*

*Primary Examiner* — Scott A Richmond
(74) *Attorney, Agent, or Firm* — Alleman Hall & Tuttle LLP

(57) ABSTRACT

A signal generation device includes a first signal generation portion and a second signal generation portion. The first signal generation portion, based on a reference signal that includes a plurality of rectangular single-wave signals, generates an original common signal in which the rise times of the two or more of the single-wave signals are extended so that they are different from each other, and the fall timing of one or more of the single-wave signals is shifted. The second signal generating portion generates a drive signal to be input to a piezoelectric element by extracting a rising edge of any one of the single-wave signals, the rise time of which is extended, from the original common signal amplified by the amplifying portion, maintaining a signal level changed by extracting the rising edge of the single-wave signal, and extracting a falling edge of a single-wave signal after the single-wave signal.

4 Claims, 8 Drawing Sheets

(56) References Cited

FOREIGN PATENT DOCUMENTS

| | | | | | |
|---|---|---|---|---|---|
| JP | 2018051804 | A | | 4/2018 | |
| WO | WO-0121408 | A1 | * | 3/2001 | .......... B41J 2/04581 |

* cited by examiner

SIGNAL GENERATION DEVICE, LIQUID EJECTION DEVICE, AND SIGNAL GENERATION METHOD CAPABLE OF SUPPRESSING EXTENSION OF LIQUID EJECTION INTERVAL

INCORPORATION BY REFERENCE

This application is based upon and claims the benefit of priority from the corresponding Japanese Patent Application No. 2022-156453 filed on Sep. 29, 2022, the entire contents of which are incorporated herein by reference.

BACKGROUND

The present disclosure relates to a signal generation device, a liquid ejection device, and a signal generation method.

A liquid ejection device such as an inkjet printer including a piezoelectric element that ejects liquid such as ink from a nozzle in response to input of a drive signal is known. In addition, a liquid ejection device is known that is able to switch the ejection amount of the liquid from the nozzle. More specifically, a liquid ejection device including a plurality of signal generation circuits capable of generating a plurality of drive signals for different ejection amounts of the liquid is known as a related technique.

SUMMARY

A signal generation device according to one aspect of the present disclosure includes a first signal generation portion, an amplifying portion, and a second signal generation portion. The first signal generation portion, based on a reference signal that includes a plurality of rectangular single-wave signals that are output at predetermined specific periods, generates an original common signal in which the rise times of the two or more of the single-wave signals included in the reference signal are extended so that they are different from each other, and the fall timing of one or more of the single-wave signals included in the reference signal is shifted. The amplifying portion amplifies the original common signal. The second signal generating portion generates a drive signal to be input to a piezoelectric element that ejects liquid from a nozzle by extracting a rising edge of any one of the single-wave signals, the rise time of which is extended, from the original common signal amplified by the amplifying portion, maintaining a signal level changed by extracting the rising edge of the single-wave signal, and extracting a falling edge of a single-wave signal occurring later than the single-wave signal.

A liquid ejection device according to another aspect of the present disclosure includes the signal generation device and the piezoelectric element. The drive signal generated by the signal generation device is input to the piezoelectric element.

A signal generation method according to another aspect of the present disclosure includes a first signal generation step, an amplifying step, and a second signal generation step. In the first signal generation step, based on a reference signal that includes a plurality of rectangular single-wave signals that are output at predetermined specific periods, an original common signal is generated in which the rise times of the two or more of the single-wave signals included in the reference signal are extended so that they are different from each other, and the fall timing of one or more of the single-wave signals included in the reference signal is shifted. In the amplifying step, the original common signal is amplified. In the second signal generation step, a drive signal to be input to a piezoelectric element that ejects liquid from a nozzle is generated by extracting a rising edge of any one of the single-wave signals, the rise time of which is extended, from the original common signal amplified by the amplifying portion, maintaining a signal level changed by extracting the rising edge of the single-wave signal, and extracting a falling edge of a subsequent single-wave signal after the single-wave signal.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Embodiments according to the present disclosure will be described below with reference to the accompanying drawings. Note that the following embodiments are examples of implementing techniques according to the present disclosure and do not limit the technical scope of the present disclosure.

[Configuration of Image Forming Apparatus 100]

Figure 1:
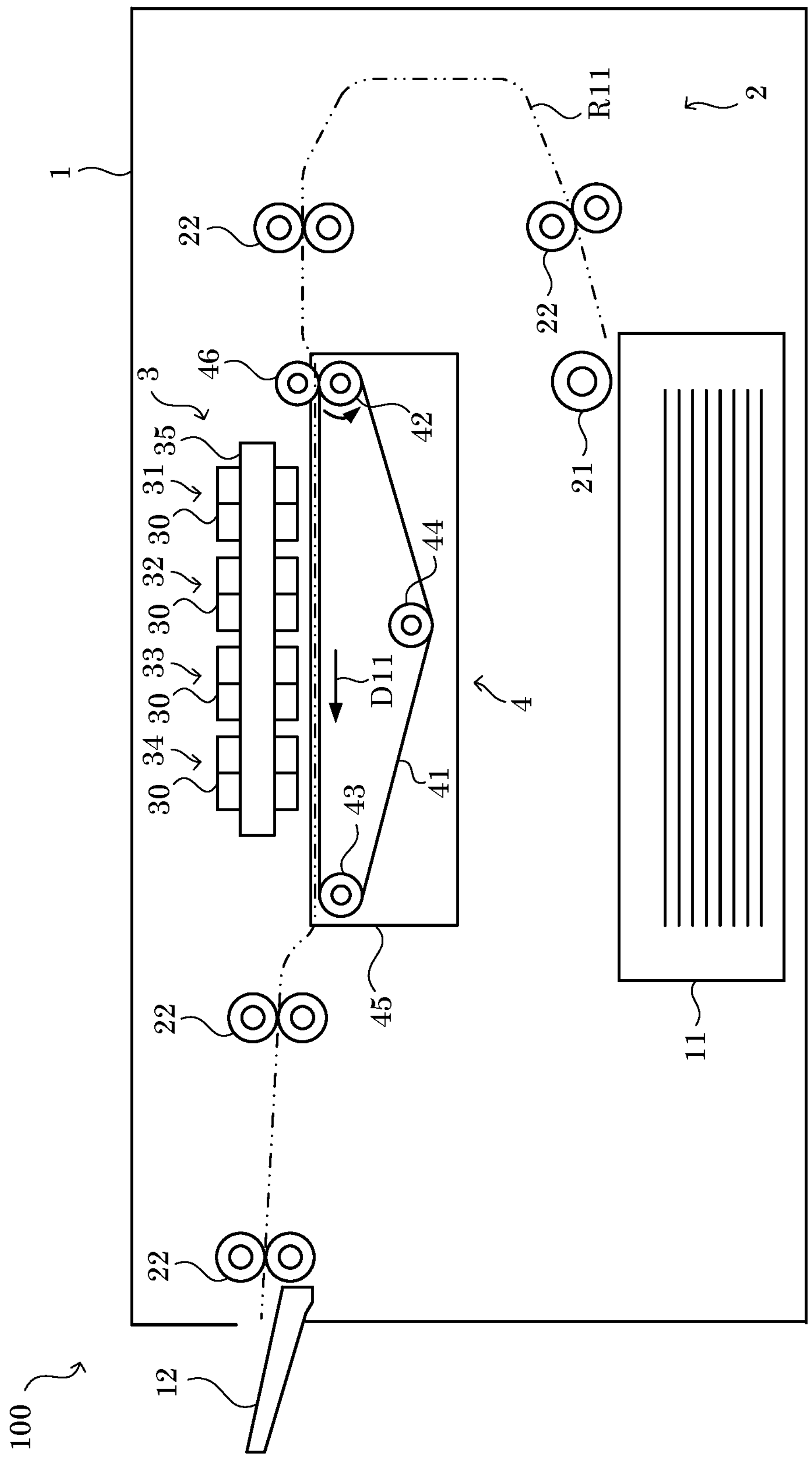
FIG. 1 is a diagram showing a configuration of an image forming apparatus of an embodiment according the present disclosure.
Figure 2:
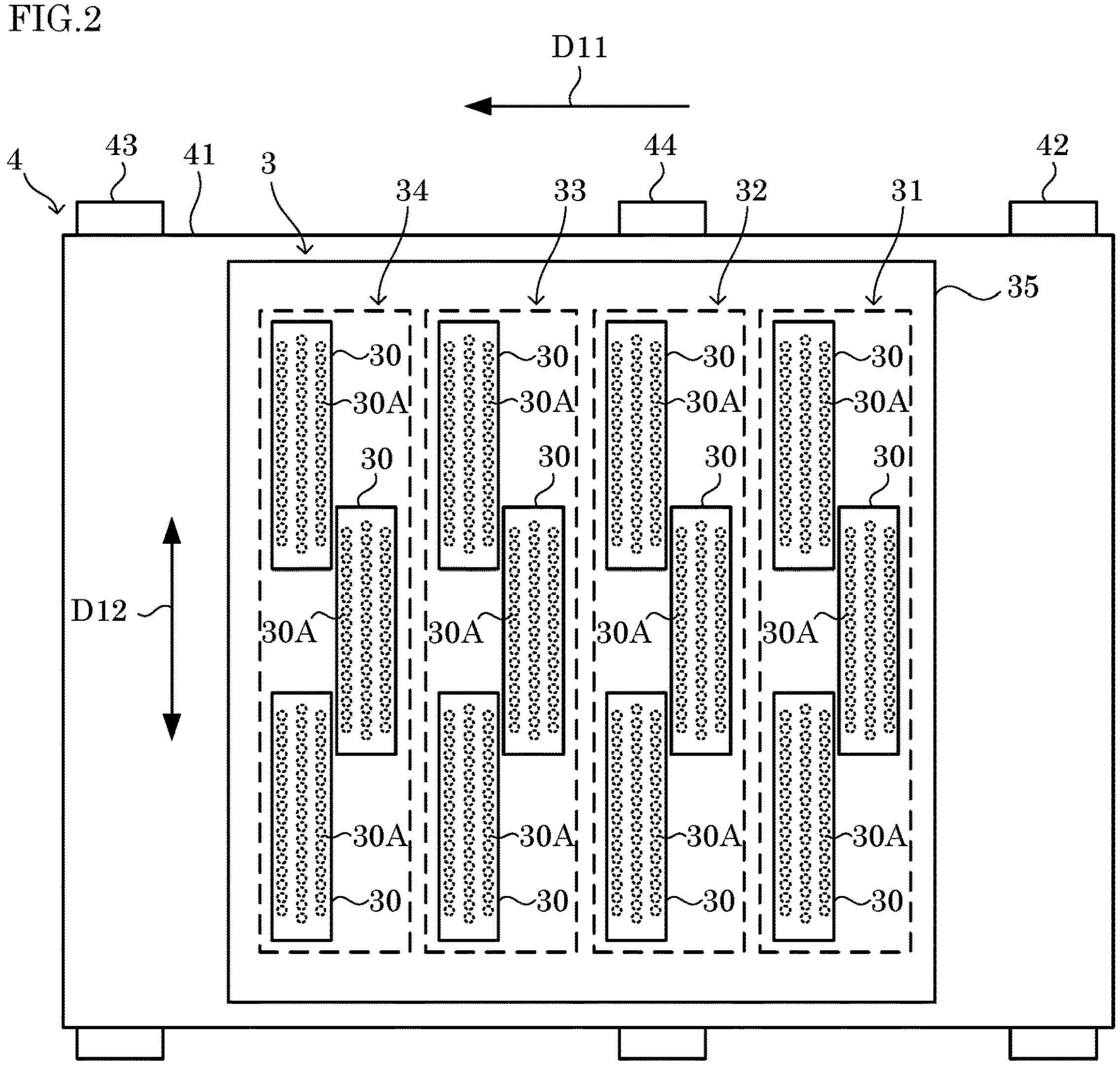
FIG. 2 is a diagram showing a configuration of an image forming portion and a conveying unit of the image forming apparatus of the embodiment according to the present disclosure.
Figure 3:
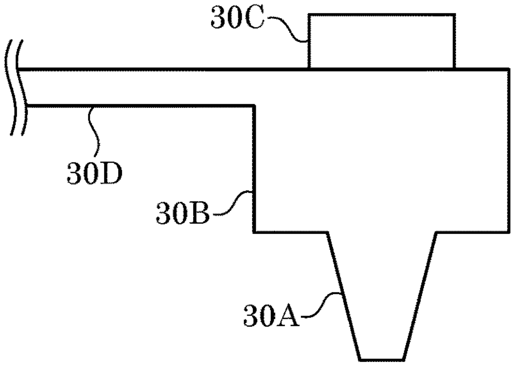
FIG. 3 is a diagram showing a configuration around nozzles of the image forming apparatus of the embodiment according to the present disclosure.

First, a configuration of an image forming apparatus 100 of an embodiment according to the present disclosure will be described with reference to FIG. 1 to FIG. 4. Here, FIG. 1 is a cross-sectional view showing the configuration of the image forming apparatus 100. In addition, FIG. 2 is a plan view showing a configuration of an image forming portion 3 and a conveying unit 4. Moreover, FIG. 3 is a cross-sectional view showing a configuration of a nozzle 30A, a pressurizing chamber 30B, a piezoelectric element 30C, and an individual flow path 30D. Note that in FIG. 1, a sheet conveying path R11 is indicated by a double-dot chain line.

The image forming apparatus 100 is a printer capable of forming an image on a sheet using an inkjet method. The image forming apparatus 100 is an example of the liquid ejection device according to the present disclosure. Note that the technique according to the present disclosure may be applied to image forming apparatuses such as facsimile machines, copiers, and multifunction peripherals capable of forming images on sheets using an inkjet method.

Figure 4:
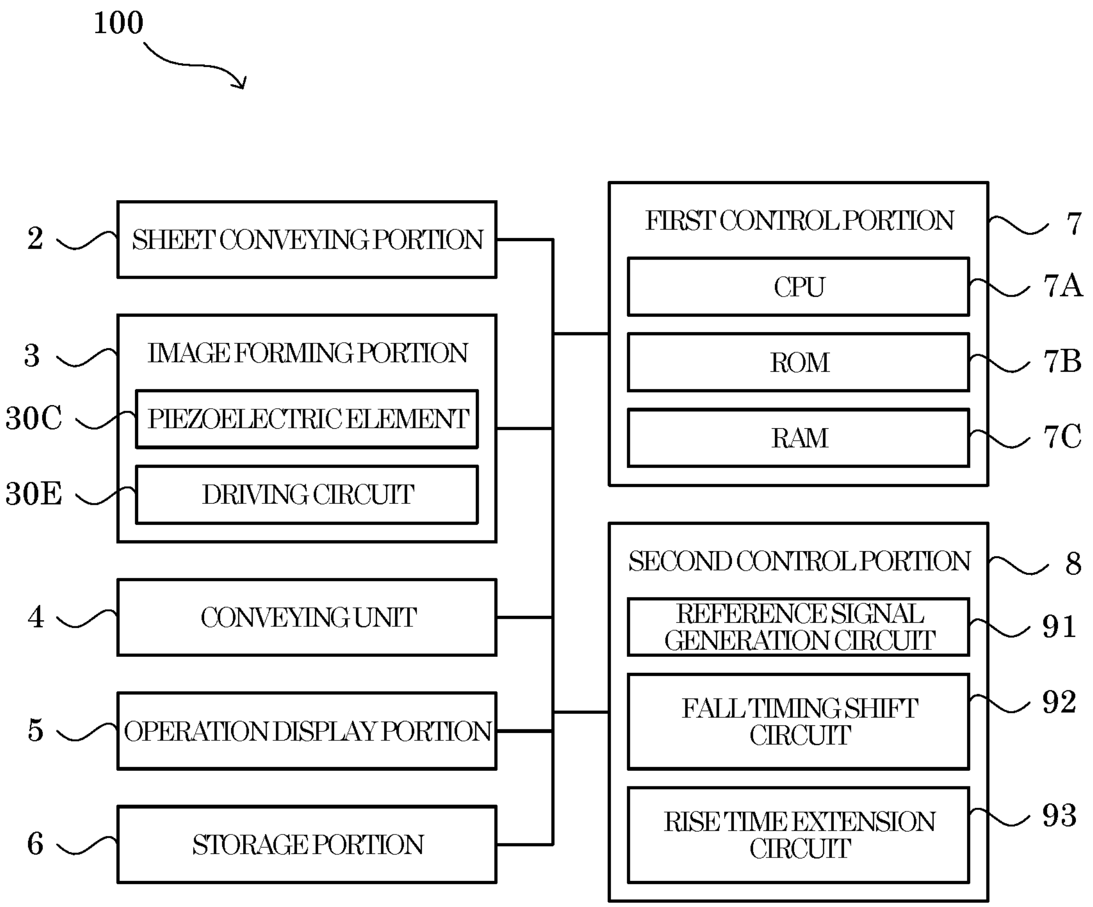
FIG. 4 is a block diagram showing a system configuration of the image forming apparatus of the embodiment according to the present disclosure.

As shown in FIG. 1 and FIG. 4, the image forming apparatus 100 includes a housing 1, a sheet conveying portion 2, an image forming portion 3, a conveying unit 4, an operation display portion 5, a storage portion 6, a first control portion 7, and a second control portion 8.

The housing 1 accommodates each component of the image forming apparatus 100. A sheet feed cassette 11 (see FIG. 1) is detachably provided in the housing 1. Sheets on which images are to be formed are accommodated in the sheet feed cassette 11. A sheet discharge tray 12 (see FIG. 1) is provided at an outer side surface of the housing 1. A sheet on which an image is formed by the image forming portion 3 is discharged to the sheet discharge tray 12. Inside the housing 1, a sheet accommodated in the sheet feed cassette 11 is conveyed along a sheet conveying path R11 (see FIG. 1) leading to the sheet discharge tray 12 via an image forming position of the image forming portion 3.

The sheet conveying portion 2 conveys the sheets accommodated in the sheet feed cassette 11 along the sheet conveying path R11 (see FIG. 1). As shown in FIG. 1, the sheet conveying portion 2 includes a pickup roller 21 and a plurality of conveying rollers 22. The pickup roller 21 picks up the uppermost sheet in a sheet bundle accommodated in the sheet feed cassette 11, and feeds the sheet to the sheet conveying path R11. The plurality of conveying rollers 22 are provided side by side along the sheet conveying path R11. Each of the conveying rollers 22 conveys the sheet along the sheet conveying path R11. Each of the conveying rollers 22 conveys the sheet in a conveying direction D11 (see FIG. 1) from the sheet feed cassette 11 toward the sheet discharge tray 12.

The image forming portion 3 forms an image on a sheet based on image data for image formation. As shown in FIG. 1, the image forming portion 3 includes line heads 31 to 34 and a head frame 35.

As shown in FIG. 2, each of the line heads 31 to 34 is elongated in a width direction D12 orthogonal to the conveying direction D11. More specifically, each of the line heads 31 to 34 has a length in the width direction D12 corresponding to a width of the maximum size sheet among the sheets that can be accommodated in the sheet feed cassette 11. The line heads 31 to 34 are provided side by side at equal intervals along the conveying direction D11.

As shown in FIG. 2, each of the line heads 31-34 has a plurality of recording heads 30. Each of the recording heads 30 ejects ink toward the sheet conveyed by the conveying unit 4. Each of the recording heads 30 provided in the line head 31 ejects black ink. Each of the recording heads 30 provided in the line head 32 ejects cyan ink.

Each of the recording heads 30 provided in the line head 33 ejects magenta ink. Each of the recording heads 30 provided in the line head 34 ejects yellow ink.

Each of the recording heads 30 includes a plurality of nozzles 30A (see FIG. 2 and FIG. 3) that eject ink. Each of the nozzles 30A is provided on a surface of the recording head 30 facing the sheet conveyed by the conveying unit 4.

Further, each of the recording heads 30 includes a pressure chamber 30B (see FIG. 3), a piezoelectric element 30C (see FIG. 3), and an individual flow path 30D (see FIG. 3) corresponding to each nozzle 30A. The pressure chamber 30B communicates with the nozzle 30A and accommodates ink. The piezoelectric element 30C ejects ink (an example of a liquid according to the present disclosure) from the nozzle 30A in response to input of a drive signal SG200 (see FIG. 8). The drive signal SG200 is an electrical signal, the voltage of which changes over time. More specifically, the piezoelectric element 30C ejects ink from the nozzle 30A by changing the pressure in the pressure chamber 30B according to the input of the drive signal SG200. The individual flow path 30D is an ink flow path provided between the pressure chamber 30B and a common flow path (not shown) common to the plurality of nozzles 30A. A plurality of individual flow paths 30D corresponding to the plurality of nozzles 30A are connected to the common flow path. The common flow path is connected to an ink supply portion (not shown) that supplies ink to each of the pressure chambers 30B.

In addition, each of the recording heads 30 also includes a driving circuit 30E (see FIG. 4) corresponding to each of the piezoelectric elements 30C. The driving circuit 30E drives the piezoelectric element 30C based on data input from the second control portion 8. More specifically, the driving circuit 30E generates the drive signal SG200 based on data inputted from the second control portion 8, and inputs the generated drive signal SG200 to the piezoelectric element 30C.

In the present embodiment, the line head 31 has three recording heads 30 arranged in a zigzag pattern along the width direction D12. In addition, each of the other line heads 32 to 34 also has three recording heads 30 arranged in a zigzag pattern along the width direction D12 in the same manner as the line head 31. Note that FIG. 2 shows a state of the image forming portion 3 as viewed from the upper side in FIG. 1.

The head frame 35 supports the line heads 31 to 34. The head frame 35 is supported by the housing 1. Note that the number of line heads provided in the image forming portion 3 may be any number. In addition, the number of recording heads 30 provided in each of the line heads 31 to 34 may be any number.

As shown in FIG. 1, the conveying unit 4 is arranged below the line heads 31 to 34. The conveying unit 4 conveys the sheet while facing the sheet toward the recording heads 30. For example, the conveying unit 4 conveys the sheet by a predetermined conveying amount each time ink is ejected by the recording heads 30. In addition, the conveying unit 4 stops conveying the sheet while the recording heads 30 are ejecting ink. As shown in FIG. 1, the conveying unit 4 includes a conveying belt 41 on which a sheet is placed, a first tension roller 42, a second tension roller 43, and a third tension roller 44 that apply tension to the conveying belt 41, and a conveying frame 45 that supports the rollers. A gap between the conveying belt 41 and the recording heads 30 is adjusted so that a gap between a surface of the sheet and the recording heads 30 during image formation is a predetermined distance (for example, 1 mm).

The first tension roller 42 is rotationally driven by a rotational driving force supplied from a motor (not shown). Thus, the conveying belt 41 rotates in a direction in which the sheet can be conveyed in the conveying direction D11 (see FIG. 1). Note that the conveying unit 4 is also provided with a suction unit (not shown) that intakes air through a large number of through holes formed in the conveying belt 41 so as to adhere the sheet to the conveying belt 41. In addition, a pressure roller 46 for pressing the sheet against the conveying belt 41 to convey the sheet is provided at an upper side of the first tension roller 42.

The operation display portion 5 has a display portion such as a liquid crystal display that displays various types of information according to control instructions from the first control portion 7, and an operation portion such as operation keys or a touch panel for inputting various types of information to the first control portion 7 according to user operation. The operation display portion 5 is provided on an upper surface of the housing 1.

The storage portion 6 is a non-volatile storage device. For example, the storage portion 6 is non-volatile memory such as flash memory.

The first control portion 7 performs overall control of the image forming apparatus 100. As shown in FIG. 4, the first control portion 7 includes a CPU 7A, a ROM 7B, and a RAM 7C. The CPU 7A is a processor that executes various types of arithmetic processes. The ROM 7B is a non-volatile storage device in which information such as a control program for causing the CPU 7A to execute various types of processes is stored in advance. The RAM 7C is a volatile or non-volatile storage device used as a temporary storage memory (work area) for various types of processes executed by the CPU 7A. The CPU 7A performs overall control of the image forming apparatus 100 by executing various types of control programs stored in advance in the ROM 7B.

The first control portion 7 inputs the image data to the second control portion 8 in a case where an image forming process for forming an image based on the image data is executed.

The second control portion 8 controls the image forming portion 3 based on the image data inputted from the first control portion 7. For example, the second control portion 8 is composed of an electronic circuit such as an integrated circuit (ASIC, DSP).

More specifically, the second control portion 8 executes a conversion process that converts each pixel data included in the image data into ejection control data DA100 (see FIG. 7) used for controlling ejection of ink by the nozzle 30A corresponding to the pixel data.

Here, the ejection control data DA100 includes ejection data and non-ejection data. The ejection data is data used for generating the drive signal SG200. In addition, non-ejection data is data corresponding to a non-input state of the drive signal SG200 to the piezoelectric element 30C.

Figure 7:
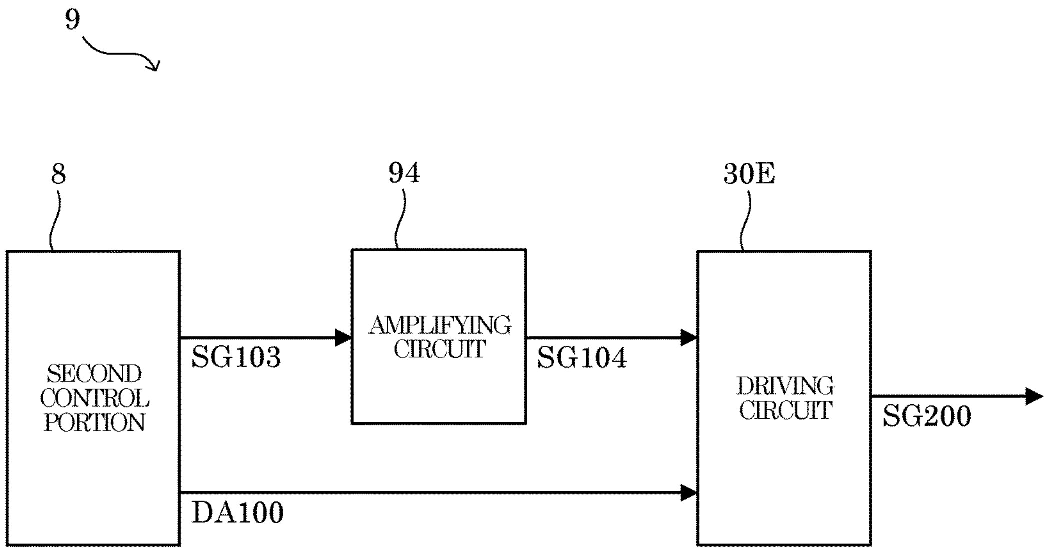
FIG. 7 is a diagram showing a configuration of a drive signal generating portion of the image forming apparatus of the embodiment according to the present disclosure.

The second control portion 8 inputs the ejection control data DA100 acquired by the conversion process to the corresponding driving circuit 30E (see FIG. 7). The driving circuit 30E generates the drive signal SG200 in a case where the input ejection control data DA100 is the ejection data. In addition, the driving circuit 30E does not generate the drive signal SG200 in a case where the input ejection control data DA100 is the non-ejection data.

A liquid ejection device is known that can switch the amount of ink ejected from the nozzle 30A. More specifically, a liquid ejection device including a plurality of signal generation circuits capable of generating a plurality of drive signals SG200 with different ink ejection amounts is known as a related technology.

Here, in the liquid ejection device according to the related technology, it is necessary to provide the same number of amplifying circuits used to generate the drive signal SG200 and signal lines used to output the generated drive signal SG200 as the number of the signal generation circuits, which complicates the configuration of the device. On the other hand, a configuration is conceivable in which a first common signal in which a plurality of drive signals SG200 are continuous is generated, and one of the drive signals SG200 is selectively extracted from the first common signal. However, in this configuration, the period of the first common signal is lengthened, and the interval between ink ejections by the nozzle 30A is correspondingly lengthened.

On the other hand, in the image forming apparatus 100 of the embodiment according to the present disclosure, as described below, it is possible to suppress the lengthening of the interval between ink ejections by the nozzle 30A and to suppress the complication of the configuration.

More specifically, the image forming apparatus 100 includes a drive signal generating portion 9 shown in FIG. 7.

[Configuration of the Drive Signal Generating Portion 9]

Figure 5:
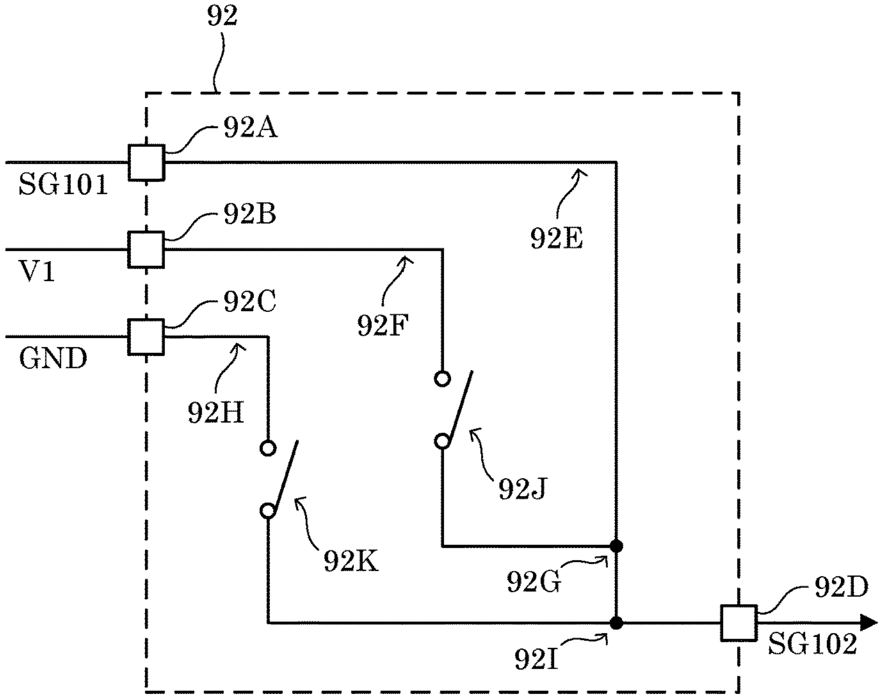
FIG. 5 is a diagram showing a configuration of a fall timing shift circuit of the image forming apparatus of the embodiment according to the present disclosure.
Figure 6:
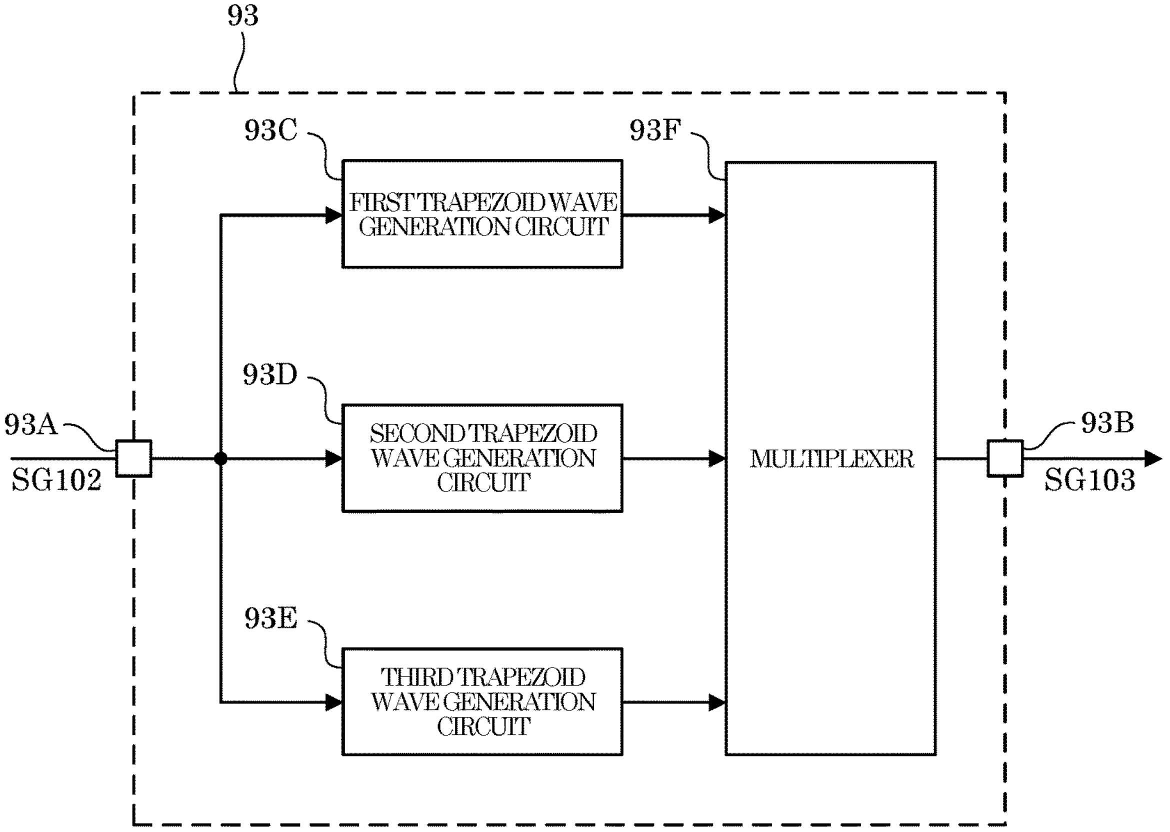
FIG. 6 is a diagram showing a configuration of a rise time extension circuit of the image forming apparatus of the embodiment according to the present disclosure.
Figure 8:
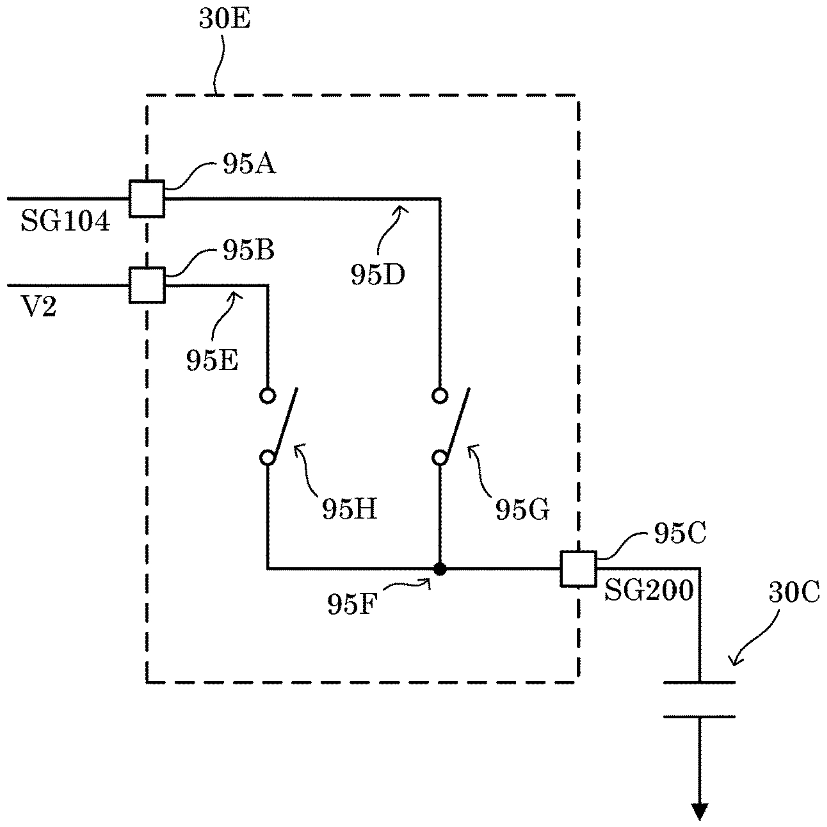
FIG. 8 is a diagram showing a configuration of a driving circuit of the image forming apparatus of the embodiment according to the present disclosure.
Figure 9:
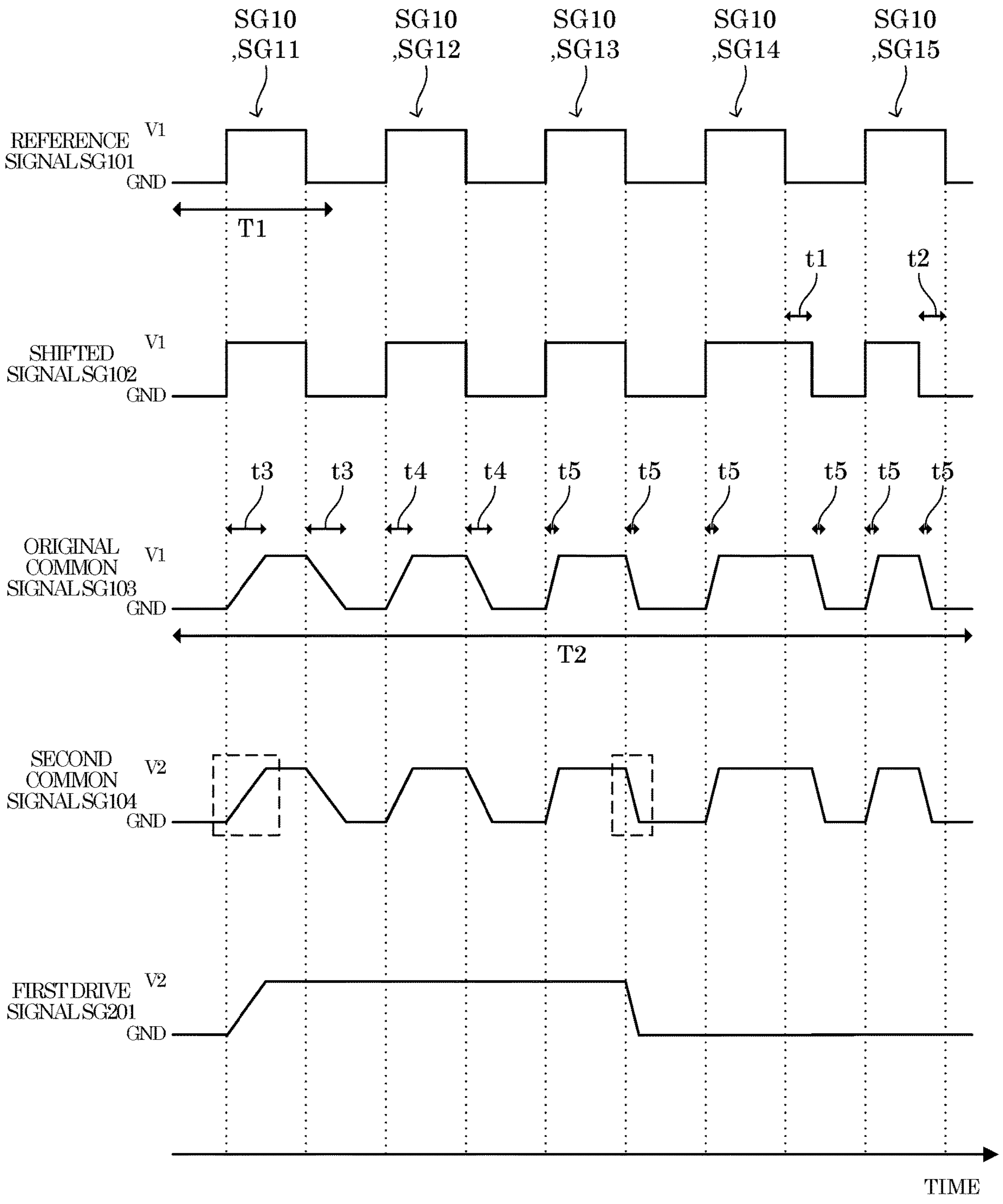
FIG. 9 is a diagram showing a first drive signal generated by the image forming apparatus of the embodiment according to the present disclosure.
Figure 10:
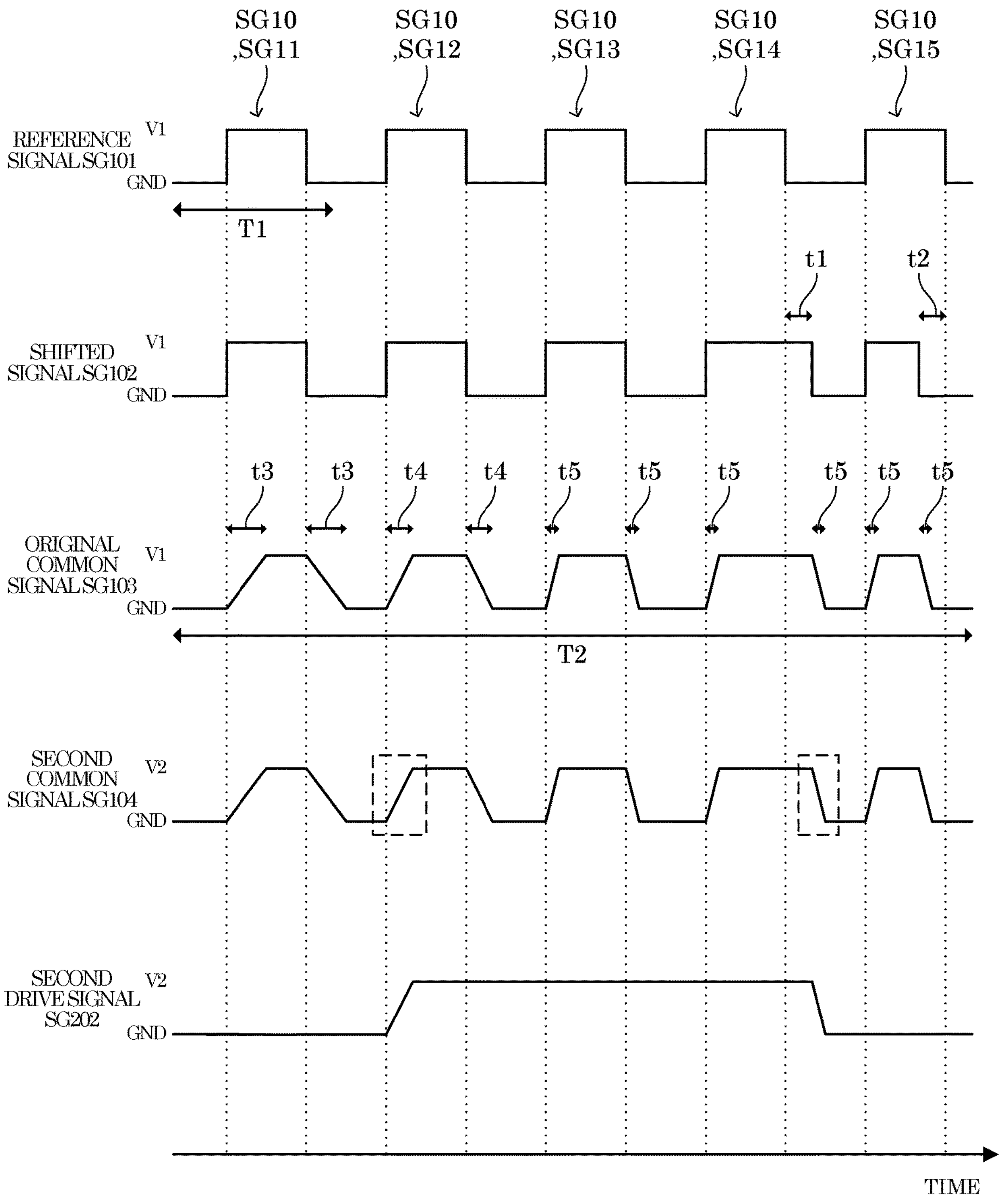
FIG. 10 is a diagram showing a second drive signal generated by the image forming apparatus of the embodiment according to the present disclosure.
Figure 11:
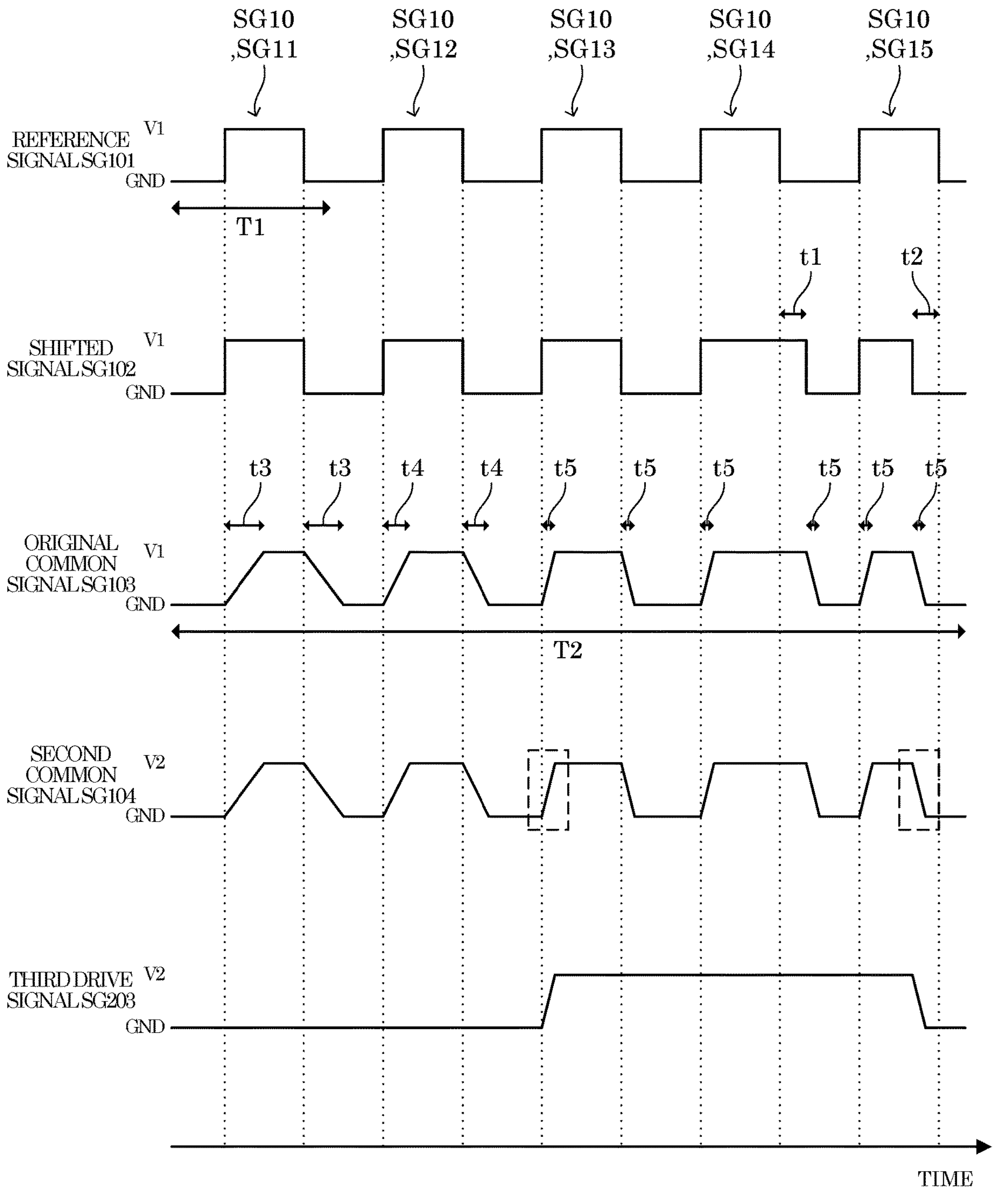
FIG. 11 is a diagram showing a third drive signal generated by the image forming apparatus of the embodiment according to the present disclosure.

Next, the configuration of the drive signal generating portion 9 will be described with reference to FIG. 4 to FIG. 11. Here, FIG. 5 is a circuit diagram showing the configuration of a fall timing shift circuit 92. In addition, FIG. 6 is a circuit diagram showing the configuration of a rise time extension circuit 93. Moreover, FIG. 7 is a circuit diagram showing the configuration of the drive signal generating portion 9. FIG. 8 is a circuit diagram showing the configuration of the driving circuit 30E. In addition, FIG. 9 to FIG. 11 are timing charts showing various signals generated by the drive signal generating portion 9. Note, in FIG. 9 to FIG. 11, a clipping target included in the original common signal SG103 is indicated by a dashed line.

The drive signal generating portion 9 selectively generates a plurality of drive signals SG200 with different ink ejection amounts.

For example, the drive signal SG200 includes a first drive signal SG201 (see FIG. 9), a second drive signal SG202 (see FIG. 10), and a third drive signal SG203 (see FIG. 11). The drive signal generating portion 9 selectively generates the first drive signal SG201, the second drive signal SG202, and the third drive signal SG203.

As shown in FIG. 7, the drive signal generating portion 9 includes the second control portion 8, an amplifying circuit 94, and the driving circuit 30E. The drive signal generating portion 9 is an example of the signal generation device according to the present disclosure.

Based on a reference signal SG101 (see FIG. 9) including a plurality of rectangular single-wave signals SG10 (see FIG. 9) output at a predetermined first period T1 (see FIG. 9), the second control portion 8 generates the original common signal SG103 (see FIG. 9) in which the rise times of the two or more single-wave signals SG10 included in the reference signal SG101 are extended so as to be different from each other, and the fall timing of one or more single-wave signals SG10 included in reference signal SG101 is shifted. The second control portion 8 is an example of a first signal generation portion according to the present disclosure. In addition, the first period T1 is an example of a specific period according to the present disclosure. Moreover, the process of generating the original common signal SG103 executed by the second control portion 8 is an example of a first signal generation step according to the present disclosure.

As shown in FIG. 4, the second control portion 8 includes a reference signal generation circuit 91, the fall timing shift circuit 92 and the rise time extension circuit 93.

The reference signal generation circuit 91 generates a reference signal SG101 (see FIG. 9).

As shown in FIG. 9, the reference signal SG101 is a signal including five single-wave signals SG10 (SG11 to SG15).

For example, the reference signal generation circuit 91 generates the reference signal SG101 by dividing a clock signal used inside the second control portion 8.

The reference signal SG101 generated by the reference signal generation circuit 91 is input to the fall timing shift circuit 92 (see FIG. 5).

The fall timing shift circuit 92 shifts the fall timing of one or more single-wave signals SG10 included in the reference signal SG101.

For example, the fall timing shift circuit 92 outputs a shifted signal SG102 shown in FIG. 9.

As shown in FIG. 9, in the shifted signal SG102, of the five single-wave signals SG11 to SG15 included in the reference signal SG101, the fall timing of the single-wave signal SG14 is delayed by a first time t1 (see FIG. 9), and the fall timing of the single-wave signal SG15 is advanced by a second time t2 (see FIG. 9).

That is, the fall timing shift circuit 92 delays the fall timing of the single-wave signal SG14 by the first time t1. In addition, the fall timing shift circuit 92 advances the fall timing of the single-wave signal SG15 by the second time t2.

For example, as shown in FIG. 5, the fall timing shift circuit 92 includes a first input terminal 92A, a second input terminal 92B, a third input terminal 92C, an output terminal 92D, a first conducting path 92E, and a second conducting path 92F, a third conducting path 92H, a first switch 92J, and a second switch 92K.

A reference signal SG101 is input to the first input terminal 92A. The second input terminal 92B is connected to a power supply that outputs a first voltage V1 having the same voltage value as the high-level voltage value of the reference signal SG101 (see FIG. 9). The third input terminal 92C is connected to ground of the second control portion 8. The shifted signal SG102 is output from the output terminal 92D. The first conducting path 92E is a conducting path from the first input terminal 92A to the output terminal 92D. The second conducting path 92F is a conducting path from the second input terminal 92B to a combined portion 92G (see FIG. 5) with the first conducting path 92E. The third conducting path 92H is a conducting path from the third input terminal 92C to the combined portion 921 (see FIG. 5) with the first conducting path 92E.

The first switch 92J is provided in the second conducting path 92F and used to delay the fall timing of the single-wave signal SG10. More specifically, the first switch 92J is switched from an OFF state to an ON state after the arrival of the rise timing of the single-wave signal SG14 (see FIG. 9) and before the arrival of the fall timing of the single-wave signal SG14. In addition, the first switch 92J is switched from the ON state to the OFF state at a timing when the first time t1 (see FIG. 9) has elapsed from the arrival of the fall timing of the single-wave signal SG14. Thus, the fall timing of the single-wave signal SG14 is delayed by the first time t1.

The second switch 92K is provided in the third conducting path 92H and is used to advance the fall timing of the single-wave signal SG10. More specifically, the second switch 92K is switched from the OFF state to the ON state at a timing of the second time t2 (see FIG. 9) before the fall timing of the single-wave signal SG15 (see FIG. 9). In addition, the second switch 92K is switched from the ON state to the OFF state after the arrival of the fall timing of the single-wave signal SG15 and before the arrival of the rise timing of the next single-wave signal SG11. Thus, the fall timing of the single-wave signal SG15 is advanced by the second time t2.

The rise time extension circuit 93 extends the rising times of the two or more single-wave signals SG10 included in the reference signal SG101 so as to have different times.

For example, the rise time extension circuit 93 outputs the original common signal SG103 shown in FIG. 9.

As shown in FIG. 9, the original common signal SG103 is a signal in which, of the five single-wave signals SG11 to SG15 included in the shifted signal SG102, the rise time and the fall time of the single-wave signal SG11 are extended by a third time t3 (see FIG. 9), the rise time and fall time of the single-wave signal SG12 are extended by a fourth time t4 (see FIG. 9), and the rise time and fall time of each of the single-wave signals SG13 to SG15 are extended by a fifth time t5 (see FIG. 9). The third time t3, the fourth time t4, and the fifth time t5 are different times.

That is, the rise time extension circuit 93 extends the rise time and fall time of the single-wave signal SG11 by the third time t3. In addition, the rise time extension circuit 93 extends the rise time and fall time of the single-wave signal SG12 by the fourth time t4. Moreover, the rise time extension circuit 93 extends the rise time and fall time of each of the single-wave signals SG13 to SG15 by the fifth time t5.

For example, as shown in FIG. 6, the rise time extension circuit 93 includes an input terminal 93A, an output terminal 93B, a first trapezoidal wave generation circuit 93C, a second trapezoidal wave generation circuit 93D, a third trapezoidal wave generation circuit 93E, and a multiplexer 93F.

The shifted signal SG102 is input to the input terminal 93A. The shifted signal SG102 input to the input terminal 93A is input to the first trapezoidal wave generation circuit 93C, the second trapezoidal wave generation circuit 93D, and the third trapezoidal wave generation circuit 93E. The original common signal SG103 is output from the output terminal 93B at a second period T2 (see FIG. 9). As shown in FIG. 9, the second period T2 is five times the first period T1. The original common signal SG103 output from the output terminal 93B is input to the amplifying circuit 94 (see FIG. 7).

The first trapezoidal wave generation circuit 93C extends the rise time and fall time of each single-wave signal SG10 sequentially input from the input terminal 93A by the third time t3. That is, the first trapezoidal wave generation circuit 93C changes the waveform of the single-wave signal SG10 into a trapezoidal waveform. The single-wave signal SG10 changed into a trapezoidal waveform by the first trapezoidal wave generation circuit 93C is input to the multiplexer 93F. Note that as the circuit configuration of the first trapezoidal wave generation circuit 93C, a circuit configuration of a known trapezoidal wave generation circuit capable of generating a trapezoidal wave from a rectangular wave may be used.

The second trapezoidal wave generation circuit 93D extends the rise time and fall time of each single-wave signal SG10 sequentially input from the input terminal 93A by the fourth time t4. The single-wave signal SG10 changed into a trapezoidal waveform by the second trapezoidal wave generation circuit 93D is input to the multiplexer 93F.

The third trapezoidal wave generation circuit 93E extends the rise time and fall time of each single-wave signal SG10 sequentially input from the input terminal 93A by the fifth time t5. The single-wave signal SG10 changed into a trapezoidal waveform by the third trapezoidal wave generation circuit 93E is input to the multiplexer 93F.

The multiplexer 93F selectively outputs one of the three single-wave signals SG10 input from the first trapezoidal wave generation circuit 93C, the second trapezoidal wave generation circuit 93D, and the third trapezoidal wave generation circuit 93E.

More specifically, the multiplexer 93F outputs the single-wave signal SG11 input from the first trapezoidal wave generation circuit 93C, in a case where the single-wave signal SG11 is input from the first trapezoidal wave generation circuit 93C, the second trapezoidal wave generation circuit 93D, and the third trapezoidal wave generation circuit 93E. In addition, the multiplexer 93F outputs the single-wave signal SG12 input from the second trapezoidal wave generation circuit 93D, in a case where the single-wave signal SG12 is input from the first trapezoidal wave generation circuit 93C, the second trapezoidal wave generation circuit 93D, and the third trapezoidal wave generation circuit 93E. Moreover, the multiplexer 93F outputs one of the single-wave signals SG13 to SG15 input from the third trapezoidal wave generation circuit 93E, in a case where one of the single-wave signals SG13 to SG15 is input from the first trapezoidal wave generation circuit 93C, the second trapezoidal wave generation circuit 93D, and the third trapezoidal wave generation circuit 93E.

The amplifying circuit 94 amplifies the original common signal SG103 (see FIG. 7) input from the rise time extension circuit 93 of the second control portion 8. The amplifying circuit 94 is an example of an amplifying portion according to the present disclosure. In addition, a process of amplifying the original common signal SG103 executed by the amplifying circuit 94 is an example of an amplifying step according to the present invention.

For example, the amplifying circuit 94 is a class D amplifying circuit that amplifies the original common signal SG103 with a predetermined amplification factor. Thus, compared to a configuration in which the amplifying circuit 94 is an analog amplifying circuit, it is possible to suppress the heat generation of the circuit as well as the power consumption of the circuit. A second common signal SG104 (see FIG. 7), which is the original common signal SG103 amplified by the amplifying circuit 94, is input to the driving circuit 30E. Note that as for the circuit configuration of the amplifying circuit 94, a circuit configuration of a known class D amplifying circuit may be used.

The driving circuit 30E generates the drive signal SG200 by extracting the rising edge of any of the single-wave signals SG10, the rise time of which has been extended, from the second common signal SG104, which is the original common signal SG103 amplified by the amplifying circuit 94, maintaining the signal level changed by extracting the rising edge of the single-wave signal SG10, and extracting the falling edge of the single-wave signal SG10 that is after that single-wave signal SG10. Here, the driving circuit 30E is an example of a second signal generating portion according to the present invention. In addition, the process of generating the drive signal SG200 executed by the driving circuit 30E is an example of a second signal generation step according to the present disclosure.

For example, as shown in FIG. 8, the driving circuit 30E includes a first input terminal 95A, a second input terminal 95B, an output terminal 95C, a first conducting path 95D, a second conducting path 95E, a first switch 95G, and a second switch 95H.

A second common signal SG104 is input to the first input terminal 95A. The second input terminal 95B is connected to a power supply that outputs a second voltage V2 having the same voltage value as a high-level voltage value of the second common signal SG104. The drive signal SG200 is output from the output terminal 95C. The first conducting path 95D is a conducting path from the first input terminal 95A to the output terminal 95C. The second conducting path 95E is a conducting path from the second input terminal 95B to a combined portion 95F (see FIG. 8) with the first conducting path 95D.

The first switch 95G is provided in the first conducting path 95D, and is used for extracting the rising edge of any of the single-wave signals SG10, the rise time of which is extended, from the second common signal SG104, and extracting the falling edge of the single-wave signal SG10 after that single-wave signal SG10.

The second switch 95H is provided in the second conducting path 95E and is used to maintain the signal level changed by extracting the rising edge of the single-wave signal SG10.

For example, in a case where the ejection control data DA100 (see FIG. 7) input from the second control portion 8 is first ejection data corresponding to the first drive signal SG201 (see FIG. 9), the driving circuit 30E generates the first drive signal SG201.

More specifically, after the single-wave signal SG15 of the second common signal SG104 (see FIG. 9) has finished falling and before the arrival of the rise timing of the next single-wave signal SG11, the driving circuit 30E switches the first switch 95G from an OFF state to an ON state. In addition, the driving circuit 30E switches the first switch 95G from the ON state to the OFF state after the single-wave signal SG11 finishes rising and before the arrival of the fall timing of the single-wave signal SG11. Thus, the rise of the single-wave signal SG11, the rise time of which is extended, is extracted from the second common signal SG104.

In addition, the driving circuit 30E switches the second switch 95H from the OFF state to the ON state after the single-wave signal SG11 finishes rising and before the first switch 95G is switched from the ON state to the OFF state. Thus, the signal level changed by extracting the rising edge of the single-wave signal SG11 is maintained.

In addition, the driving circuit 30E switches the first switch 95G from the OFF state to the ON state after the single-wave signal SG13 of the second common signal SG104 (see FIG. 9) has finished rising and before the arrival of the fall timing of the single-wave signal SG13. Further, the driving circuit 30E switches the second switch 95H from the ON state to the OFF state after the first switch 95G is switched from the OFF state to the ON state and before the arrival of the fall timing of the single-wave signal SG13. Moreover, the driving circuit 30E switches the first switch 95G from the ON state to the OFF state after the single-wave signal SG13 has finished falling and before the arrival of the rise timing of the next single-wave signal SG14. Thus, the falling edge of the single-wave signal SG13 is extracted from the second common signal SG104.

In addition, in a case where the ejection control data DA100 (see FIG. 7) input from the second control portion 8 is second ejection data corresponding to the second drive signal SG202 (see FIG. 10), the driving circuit 30E generates the second drive signal SG202.

More specifically, after the single-wave signal SG11 of the second common signal SG104 (see FIG. 10) has finished falling and before the arrival of the rise timing of the next single-wave signal SG12, the driving circuit 30E switches the first switch 95G from the OFF state to the ON state. In addition, the driving circuit 30E switches the first switch 95G from the ON state to the OFF state after the single-wave signal SG12 finishes rising and before the arrival of the fall timing of the single-wave signal SG12. Thus, the rise of the single-wave signal SG12, the rise time of which is extended, is extracted from the second common signal SG104.

Further, the driving circuit 30E switches the second switch 95H from the OFF state to the ON state after the single-wave signal SG12 finishes rising and before the first switch 95G is switched from the ON state to the OFF state. Thus, the signal level changed by extracting the rising edge of the single-wave signal SG12 is maintained.

In addition, the driving circuit 30E switches the first switch 95G from the OFF state to the ON state after the single-wave signal SG14 of the second common signal SG104 (see FIG. 10) has finished rising and before the arrival of the fall timing of the single-wave signal SG14. Moreover, the driving circuit 30E switches the second switch 95H from the ON state to the OFF state after the first switch 95G is switched from the OFF state to the ON state and before the arrival of the fall timing of the single-wave signal SG14. Further, the driving circuit 30E switches the first switch 95G from the ON state to the OFF state after the single-wave signal SG14 has finished falling and before the arrival of the rise timing of the next single-wave signal SG15. Thus, the falling edge of the single-wave signal SG14 is extracted from the second common signal SG104.

In addition, in a case where the ejection control data DA100 (see FIG. 7) input from the second control portion 8 is third ejection data corresponding to a third drive signal SG203 (see FIG. 11), the driving circuit 30E generates the third drive signal SG203.

More specifically, after the single-wave signal SG12 of the second common signal SG104 (see FIG. 11) has finished falling and before the arrival of the rise timing of the next single-wave signal SG13, the driving circuit 30E switches the first switch 95G from the OFF state to the ON state. In addition, the driving circuit 30E switches the first switch 95G from the ON state to the OFF state after the single-wave signal SG13 finishes rising and before the arrival of the fall timing of the single-wave signal SG13. Thus, the rise of the single-wave signal SG13, the rise time of which is extended, is extracted from the second common signal SG104.

In addition, the driving circuit 30E switches the second switch 95H from the OFF state to the ON state after the single-wave signal SG13 finishes rising and before the first switch 95G is switched from the ON state to the OFF state. Thus, the signal level changed by extracting the rising edge of the single-wave signal SG13 is maintained.

In addition, the driving circuit 30E switches the first switch 95G from the OFF state to the ON state after the single-wave signal SG15 of the second common signal SG104 (see FIG. 11) has finished rising and before the arrival of the fall timing of the single-wave signal SG15. Moreover, the driving circuit 30E switches the second switch 95H from the ON state to the OFF state after the first switch 95G is switched from the OFF state to the ON state and before the arrival of the fall timing of the single-wave signal SG15. Further, the driving circuit 30E switches the first switch 95G from the ON state to the OFF state after the single-wave signal SG15 has finished falling and before the arrival of the rise timing of the next single-wave signal SG11. Thus, the falling edge of the single-wave signal SG15 is extracted from the second common signal SG104.

Thus, in the image forming apparatus 100, the original common signal SG103 (see FIG. 9) is generated based on the reference signal SG101 (see FIG. 9). In addition, the original common signal SG103 is amplified. The drive signal SG200 is generated by using the rising edge of any single-wave signal SG10, which is selectively extracted from the second common signal SG104 that is the original common signal SG103 after amplification and the rise timing of which is extended, and the falling edge of the single-wave signal SG10 after that single-wave signal SG10. Thus, as compared with a configuration in which a plurality of the signal generation circuits corresponding to a plurality of drive signals SG200 are provided, it is not necessary to provide the same number of amplifying circuits 94 and signal lines for the signals output from the amplifying circuits 94 as the number of the signal generation circuits, and thus complication of the configuration can be suppressed. In addition, compared to a configuration in which the first common signal, in which a plurality of drive signals SG200 are continuous, is generated and one of the drive signals SG200 is selectively extracted from the first common signal, it is possible to suppress the lengthening of time of the ink ejection interval from the nozzles 30A.

Further, in the image forming apparatus 100, the fall timing of one or more single-wave signals SG10 included in the reference signal SG101 (see FIG. 9) is shifted. As a result, in comparison with a configuration in which the fall timing of the single-wave signal SG10 included in the reference signal SG101 is not shifted, it is possible to widen the adjustment range of the ON time (time during which the signal level is high) of the drive signal SG200. This is because in a configuration in which the fall timing of the single-wave signal SG10 included in the reference signal SG101 is not shifted, the ON time of the drive signal SG200 can only be adjusted in units of integral multiples of the first period T1. Note that when the first period T1 is made shorter, finer adjustment becomes possible. However, since the single-wave signal SG11 changed into a trapezoidal waveform must be contained within the first period T1, there is a limit to how much the adjustment range may be expanded by shortening the first period T1. On the other hand, in the image forming apparatus 100, the ON time of the drive signal SG200 can be adjusted without being limited to units of integral multiples of the first period T1. Thus, fine adjustment of the ON time of the drive signal SG200 according to physical properties of the ink, the shape of the nozzles 30A, and the like becomes possible, and the quality of the image formed by the image forming apparatus 100 can be improved.

Note that the number of single-wave signals SG10 included in the reference signal SG101 may be any number.

In addition, the number of single-wave signals SG10, the fall timings of which have been shifted by the fall timing shift circuit 92, may be any number. Moreover, the first time t1 and the second time t2 may be determined arbitrarily.

Further, the number of single-wave signals SG10, the rise times of which have been extended by the rise time extension circuit 93, may be any number equal to or greater than two. In addition, the third time t3, the fourth time t4, and the fifth time t5 may be arbitrarily determined. Moreover, the rise time extension circuit 93 may extend only the rise time of the single-wave signal SG10 and not extend the fall time.

In addition, the fall timing shift circuit 92 may shift the fall timing of one or more single-wave signals SG10 included in the reference signal SG101 output from the rise time extension circuit 93, of which the rise times of two or more single-wave signals SG10 have been extended.

Further, the liquid according to the present disclosure need not be limited to ink.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. A signal generation device, comprising:

a first signal generation portion configured to, based on a reference signal that includes a plurality of rectangular single-wave signals that are output at predetermined specific periods, generate an original common signal in which the rise times of the two or more of the single-wave signals included in the reference signal are extended so that they are different from each other, and the fall timing of one or more of the single-wave signals included in the reference signal is shifted;

an amplifying portion configured to amplify the original common signal; and a second signal generating portion configured to generate a drive signal to be input to a piezoelectric element that ejects liquid from a nozzle by extracting a rising edge of any one of the single-wave signals, the rise time of which is extended, from the original common signal amplified by the amplifying portion, maintaining a signal level changed by extracting the rising edge of the single-wave signal, and extracting a falling edge of a single-wave signal occurring later than the single-wave signal.

2. The signal generation device according to claim 1, wherein:

the first signal generation portion comprises:

a reference signal generation circuit configured to generate the reference signal;

a rise time extension circuit configured to extend rise times of two or more of the single-wave signals included in the reference signal to have different times; and a fall timing shift circuit configured to shift fall timing of one or more of the single-wave signals included in the reference signal.

3. A liquid ejection device, comprising:

the signal generation device according to claim 1; and the piezoelectric element to which the drive signal generated by the signal generation device is input.

4. A signal generation method, comprising:

a first signal generation step of, based on a reference signal that includes a plurality of rectangular single-wave signals that are output at predetermined specific periods, generating an original common signal in which the rise times of the two or more of the single-wave signals included in the reference signal are extended so that they are different from each other, and the fall timing of one or more of the single-wave signals included in the reference signal is shifted;

an amplifying step of amplifying the original common signal; and a second signal generating step of generating a drive signal to be input to a piezoelectric element that ejects liquid from a nozzle by extracting a rising edge of any one of the single-wave signals, the rise time of which is extended, from the original common signal amplified by the amplifying portion, maintaining a signal level changed by extracting the rising edge of the single-wave signal, and extracting a falling edge of a single-wave signal occurring later than the single-wave signal.

* * * * *